US008533504B2

(12) United States Patent
Archer et al.

(10) Patent No.: US 8,533,504 B2
(45) Date of Patent: Sep. 10, 2013

(54) REDUCING POWER CONSUMPTION DURING EXECUTION OF AN APPLICATION ON A PLURALITY OF COMPUTE NODES

(75) Inventors: Charles J. Archer, Rochester, MN (US); Michael A. Blocksome, Rochester, MN (US); Amanda E. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 12/129,334

(22) Filed: May 29, 2008

(65) Prior Publication Data

US 2009/0300386 A1 Dec. 3, 2009

(51) Int. Cl.
G06F 1/00 (2006.01)
G06F 1/26 (2006.01)
G06F 1/32 (2006.01)
G06F 9/00 (2006.01)
G06F 9/24 (2006.01)
G06F 15/177 (2006.01)
G11C 5/14 (2006.01)

(52) U.S. Cl.
USPC .............. 713/320; 713/1; 713/324; 365/226; 365/227

(58) Field of Classification Search
USPC ............. 713/1, 100, 300, 320, 324; 711/170, 711/171; 365/226, 227
See application file for complete search history.

(56) References Cited

U.S. PATENT DOCUMENTS

| 5,535,373 | A | 7/1996 | Olnowich et al. |
| 7,281,146 | B2 | 10/2007 | Natawadi et al. |
| 7,284,137 | B2 | 10/2007 | Clark et al. |
| 7,305,569 | B2 | 12/2007 | Reilly |
| 7,526,661 | B2 | 4/2009 | Nakajima et al. |
| 7,598,702 | B2 | 10/2009 | Walrath |
| 7,697,495 | B2 | 4/2010 | Armstrong et al. |
| 7,716,500 | B2 | 5/2010 | Eslinger |
| 7,870,439 | B2 | 1/2011 | Fujiyama et al. |
| 8,004,234 | B2 | 8/2011 | Walrath |
| 8,103,463 | B2 | 1/2012 | Kalgren et al. |
| 8,179,787 | B2 | 5/2012 | Knapp et al. |

(Continued)

FOREIGN PATENT DOCUMENTS

GB 2426360 A * 11/2006

OTHER PUBLICATIONS

Office Action, U.S. Appl. No. 12/127,035, Jan. 5, 2011.
Office Action, U.S. Appl. No. 12/135,593, Mar. 30, 2011.

(Continued)

Primary Examiner — Kim Huynh
Assistant Examiner — Brandon Kinsey
(74) Attorney, Agent, or Firm — Biggers & Obanian, LLP

(57) ABSTRACT

Methods, apparatus, and products are disclosed for reducing power consumption during execution of an application on a plurality of compute nodes that include: powering up, during compute node initialization, only a portion of computer memory of the compute node, including configuring an operating system for the compute node in the powered up portion of computer memory; receiving, by the operating system, an instruction to load an application for execution; allocating, by the operating system, additional portions of computer memory to the application for use during execution; powering up the additional portions of computer memory allocated for use by the application during execution; and loading, by the operating system, the application into the powered up additional portions of computer memory.

15 Claims, 7 Drawing Sheets

(56) References Cited

U.S. PATENT DOCUMENTS

| | | |
|---|---|---|
| 2002/0186660 A1 | 12/2002 | Bahadiroglu |
| 2003/0023825 A1* | 1/2003 | Woo et al. .................... 711/170 |
| 2004/0153867 A1 | 8/2004 | McAlinden et al. |
| 2005/0055590 A1 | 3/2005 | Farkas et al. |
| 2005/0177327 A1 | 8/2005 | Banginwar et al. |
| 2006/0253507 A1* | 11/2006 | Schank et al. ................ 707/205 |
| 2006/0282838 A1 | 12/2006 | Gupta et al. |
| 2007/0005998 A1* | 1/2007 | Jain et al. ..................... 713/300 |
| 2007/0033367 A1* | 2/2007 | Sakarda et al. ............... 711/170 |
| 2007/0067657 A1 | 3/2007 | Ranganathan et al. |
| 2007/0252552 A1 | 11/2007 | Walraith et al. |
| 2007/0300083 A1 | 12/2007 | Goodrum et al. |
| 2008/0178029 A1 | 7/2008 | McGrane et al. |
| 2008/0228462 A1 | 9/2008 | Gross et al. |
| 2008/0234873 A1 | 9/2008 | Gorbatov et al. |
| 2008/0313482 A1* | 12/2008 | Karlapalem et al. .......... 713/324 |
| 2009/0024819 A1* | 1/2009 | Fisher et al. .................. 711/170 |
| 2009/0046585 A1 | 2/2009 | Faraj et al. |
| 2009/0187658 A1 | 7/2009 | Williams et al. |
| 2009/0265568 A1* | 10/2009 | Jackson ........................ 713/320 |
| 2011/0029799 A1 | 2/2011 | Walrath |

OTHER PUBLICATIONS

Office Action, U.S. Appl. No. 12/129,334, May 29, 2008.
Office Action, U.S. Appl. No. 12/129,205, May 29, 2008.
Office Action, U.S. Appl. No. 12/135,593, Aug. 26, 2011.
Final Office Action, U.S. Appl. No. 12/129,334, Jan. 24, 2012.
Notice of Allowance, U.S. Appl. No. 12/129,319, Feb. 1, 2012.
Final Office Action, U.S. Appl. No. 12/135,604, Apr. 26, 2012.
Office Action, U.S. Appl. No. 12/135,593, Feb. 15, 2012.
Notice of Allowance, U.S. Appl. No. 12/135,660, Jun. 7, 2012.
Notice of Allowance U.S. Appl. No. 13/277,350, Dec. 14, 2011.
Office Action, U.S. Appl. No. 12/129,334, Sep. 13, 2012.
Office Action, U.S. Appl. No. 12/129,205, Aug. 30, 2012.
Office Action, U.S. Appl. No. 12/770,187, Aug. 6, 2012.
Notice of Allowance, U.S. Appl. No. 13/557,320, Jul. 25, 2012.

* cited by examiner

US 8,533,504 B2

REDUCING POWER CONSUMPTION DURING EXECUTION OF AN APPLICATION ON A PLURALITY OF COMPUTE NODES

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for reducing power consumption during execution of an application on a plurality of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

While processing parallel applications, each compute node generally utilizes only a certain portion of the total computer memory available to that compute node. The utilized portion of each compute node's computer memory stores that node's operating system, network communications libraries, an instance of the application for processing, and so on. The unused portions of each node's computer memory, however, remain idle. Because the computer memory utilized in many compute nodes typically requires that its data contents constantly be refreshed, such computer memory often consumes large amounts of power regardless whether that memory is actively used or idle. The portions of computer memory that are unused, therefore, often waste considerable amounts of power while those portions are idle during execution of an application.

SUMMARY OF THE INVENTION

Methods, apparatus, and products are disclosed for reducing power consumption during execution of an application on a plurality of compute nodes that include: powering up, during compute node initialization, only a portion of computer memory of the compute node, including configuring an operating system for the compute node in the powered up portion of computer memory; receiving, by the operating system, an instruction to load an application for execution; allocating, by the operating system, additional portions of computer memory to the application for use during execution; powering up the additional portions of computer memory allocated for use by the application during execution; and loading, by the operating system, the application into the powered up additional portions of computer memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
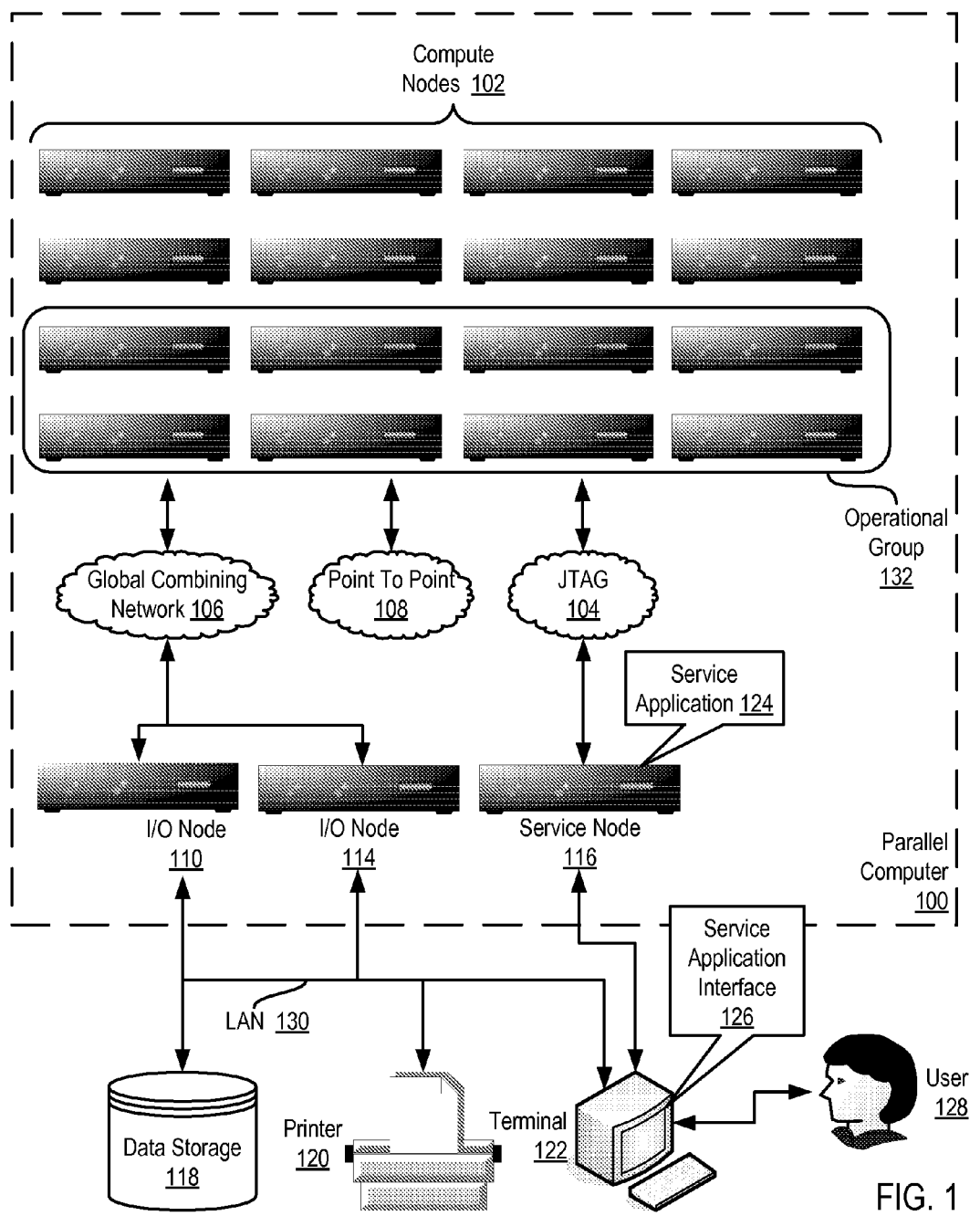
FIG. 1 illustrates an exemplary system for reducing power consumption during execution of an application on a plurality of compute nodes according to embodiments of the present invention.

Exemplary methods, apparatus, and computer program products for reducing power consumption during execution of an application on a plurality of compute nodes according to embodiments of the present invention are described with reference to the accompanying drawings, beginning with FIG. 1. FIG. 1 illustrates an exemplary system for reducing power consumption during execution of an application on a plurality of compute nodes (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard.

MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the exemplary system of FIG. 1, each compute node (102) includes a set of computer program instructions capable of reducing power consumption during execution of an application on the plurality of compute nodes (102) according to embodiments of the present invention. Each compute node (102) operates generally for reducing power consumption during execution of an application on the plurality of compute nodes (102) according to embodiments of the present invention by: powering up, during compute node initialization, only a portion of computer memory of the compute node (102), including configuring an operating system for the compute node (102) in the powered up portion of computer memory; receiving, by the operating system, an instruction to load an application for execution; allocating, by the operating system, additional portions of computer memory to the application for use during execution; powering up the additional portions of computer memory allocated for use by the application during execution; and loading, by the operating system, the application into the powered up additional portions of computer memory. Each compute node (102) may also operate generally for reducing power consumption during execution of an application on the plurality of compute nodes (102) according to embodiments of the present invention by: identifying, by the operating system, unused portions of the computer memory allocated to the application, the unused portions not utilized by the application during execution; and reducing power to at least some of the unused portions of the computer memory allocated to the application.

The phrase 'compute node initialization' as applied to compute nodes generally refers to the process of initializing compute node components to prepare the compute node for executing application layer software. Such compute node initialization may occur when power is first applied to each compute node, when power is cycled to each compute node, or when certain reset values are written to component registers. The process of compute node initialization may include loading system layer software such as an operating system to provide an interface through which application layer software may access the node's hardware. Such system layer software however may be quite lightweight by comparison with system layer software of general purpose computers. That is, such system layer software may be a pared down version as it were of system layer software developed for general purpose computers.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although reducing power consumption during execution of an application on a plurality of compute nodes according to embodiments of the present invention is described above in terms of an architecture for a parallel computer, readers will note that such an embodiment is for explanation only and not for limitation. In fact, reducing power consumption during execution of an application on a plurality of compute nodes according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of reducing power consumption during execution of an application on a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of reducing power consumption during execution of an application on a plurality of compute nodes according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Reducing power consumption during execution of an application on a plurality of compute nodes according to embodiments of the present invention may be generally implemented on a parallel computer, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of reducing power consumption during execution of an application on a plurality of compute nodes according to embodiments of the present invention. The compute node (152) of FIG. 2 includes one or more computer processors (164) as well as computer memory (156). The processors (164) are connected to the computer memory (156) through a high-speed memory bus (154) and through a bus adapter (194) and are connected to other components of the compute node (152) through an extension bus (168).

Figure 2:
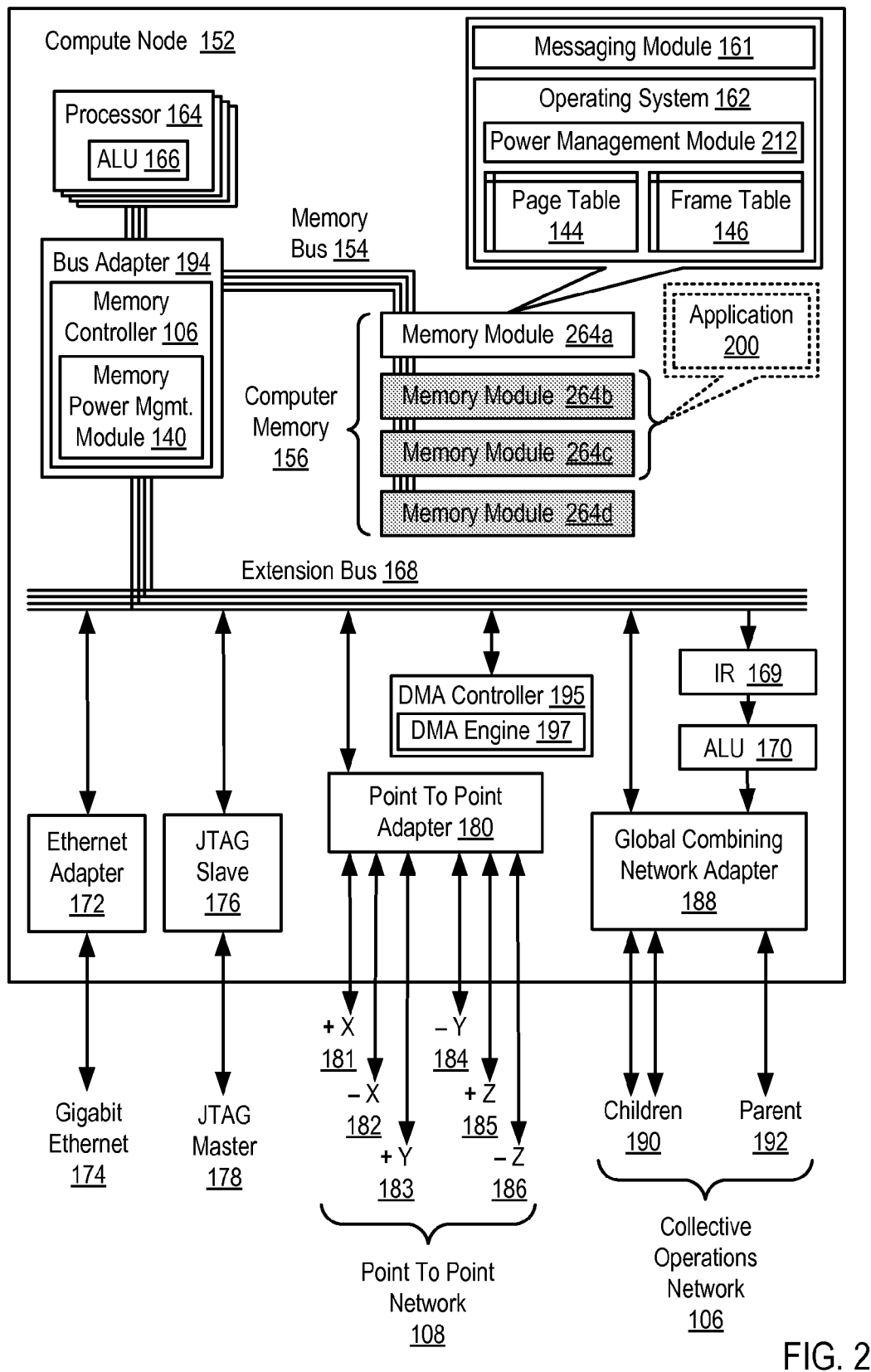
FIG. 2 sets forth a block diagram of an exemplary compute node useful in a parallel computer capable of reducing power consumption during execution of an application on a plurality of compute nodes according to embodiments of the present invention.

The computer memory (156) of FIG. 2 is implemented as four memory modules (264). Each memory module (264) is a group of random access memory ('RAM') integrated circuits along with supporting integrated circuits and circuitry mounted on a printed circuit board. A memory module may be implemented as a single in-line memory module ('SIMM'), dual in-line memory module ('DIMM'), and in other form factors as will occur to those of skill in the art.

The bus adapter (194) of FIG. 2 includes a memory controller (106) that controls the memory module (264) and manages the flow of information between the memory modules (264) and the other components of the compute node (152). The memory controller (106) of FIG. 2 includes a memory power management module (140), a set of computer program instructions for reducing power consumption during execution of an application on a plurality of compute nodes according to embodiments of the present invention. The memory power management module (140) of FIG. 2 operates generally for reducing power consumption during execution of an application on a plurality of compute nodes according to embodiments of the present invention by: powering up, during compute node initialization, only a portion of computer memory (156) of the compute node (152), including configuring an operating system (162) for the compute node (152) in the powered up portion of computer memory (156). In FIG. 2, the portion of computer memory (156) powered up is implemented in memory module (264a). The grey background for the other memory modules (264b-d) indicates that those memory modules (264b-d) are powered down, while the memory module (264a) is powered up.

The operating system (162) of FIG. 2 is a module of computer program instructions and routines that provides an application program with access to other resources of the compute node (152). It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The operating system (162) of FIG. 2 includes a set of computer program instructions for reducing power consumption during execution of an application (200) on a plurality of compute nodes according to embodiments of the present invention. The operating system (162) of FIG. 2 operates generally for reducing power consumption during execution of an application (200) on a plurality of compute nodes according to embodiments of the present invention by: receiving an instruction to load an application (200) for execution; allocating additional portions of computer memory (156) to the application (200) for use during execution; powering up the additional portions of computer memory (156) allocated for use by the application (200) during execution; and loading the application (200) into the powered up additional portions of computer memory (156). In the example of FIG. 2, the operating system (162) allocates to the application (200) additional portions of the computer memory (156) from memory modules (264b-c). The application (200) of FIG. 2 is a set of computer program instructions that provide user-level data processing.

The operating system (162) of FIG. 2 may allocate additional portions of computer memory (156) to the application (200) for use during execution using a page table (144). The page table (144) of FIG. 2 is used by a virtual memory system in the operating system (162) to store a mapping between virtual memory addresses and physical memory addresses in computer memory (156). The mapping between virtual addresses and physical addresses is represented in the page table (144) by associating virtual address page numbers and physical address frame numbers respectively. The page table (144) may also include additional information about a memory page, such as, for example, whether the memory page is presently in the computer memory (156) or stored in non-volatile computer storage (not shown). Whether the page is presently in the computer memory (156) is represented in the page table (144) by a present bit on each entry in the page table (144). The example page table in FIG. 2 also includes, in the form of a dirty bit, an indication whether a page has been modified after the page was loaded into computer memory (156). A memory page that has been modified is written back to non-volatile computer storage in order to preserve any changes. Readers will note that the description above of the exemplary page table (144) of FIG. 2 is for explanation and not for limitation. Other page tables having other formats as will occur to those of skill in the art may also be useful according to embodiments of the present invention.

The operating system (162) of FIG. 2 may also operate generally for reducing power consumption during execution of an application (200) on a plurality of compute nodes according to embodiments of the present invention by: identifying unused portions of the computer memory (156) allocated to the application (200), the unused portions not utilized by the application (200) during execution; and reducing power to at least some of the unused portions of the computer memory (156) allocated to the application (200). The operating system (162) of FIG. 2 may identify unused portions of the computer memory (156) using a frame table (146). The frame table (146) records which frames of physical computer memory (156) are free to be mapped to pages of virtual memory using an allocated bit associated with an identifier for each frame of physical computer memory (156). A frame of physical computer memory (156) is allocated when the frame is mapped to a page of virtual memory, and a frame of physical memory is unallocated when the frame is not mapped to a page of virtual memory. In some operating systems the frame table (146) may also hold additional information, such as, for example, statistical information, or other background information. Such statistical information may be implemented as, for example, the number of times that a frame is accessed, an indication of when the frame was last accessed, and so on. Readers will note that the description above of the exemplary frame table (146) of FIG. 2 is for explanation and not for limitation. Other frame tables having other formats as will occur to those of skill in the art may also be useful according to embodiments of the present invention.

The operating system (162) includes a power management module (212). The power management module (212) is a service of the operating system (162) that manages the power provided and consumed by the hardware components of the compute node (162). The power management module (212) of FIG. 2 may manage power for the computer memory (156) of the computer node (152) through the memory controller (106), which in turn may control power to the computer memory (156) through the memory bus (154) or through an out of band bus (not shown) such as, for example, an Inter-Integrated Circuit ('I2C') bus, a JTAG network, a System Management Bus ('SMBus'), and so on.

Also stored in computer memory (156), specifically memory module (264a), is a messaging module (161), a library of computer program instructions that carry out parallel communications among compute nodes, including point to point operations as well as collective operations. User-level applications such as application (200) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for reducing power consumption during execution of an application on a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in reducing power consumption during execution of an application on a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
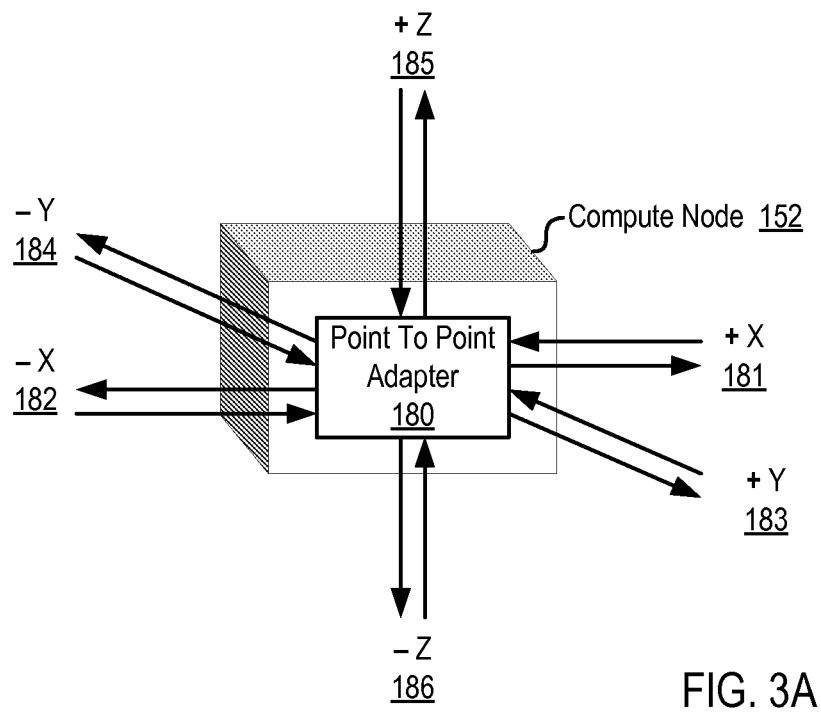
FIG. 3A illustrates an exemplary Point To Point Adapter useful in systems capable of reducing power consumption during execution of an application on a plurality of compute nodes according to embodiments of the present invention.

For further explanation, FIG. 3A illustrates an exemplary Point To Point Adapter (180) useful in systems capable of reducing power consumption during execution of an application on a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
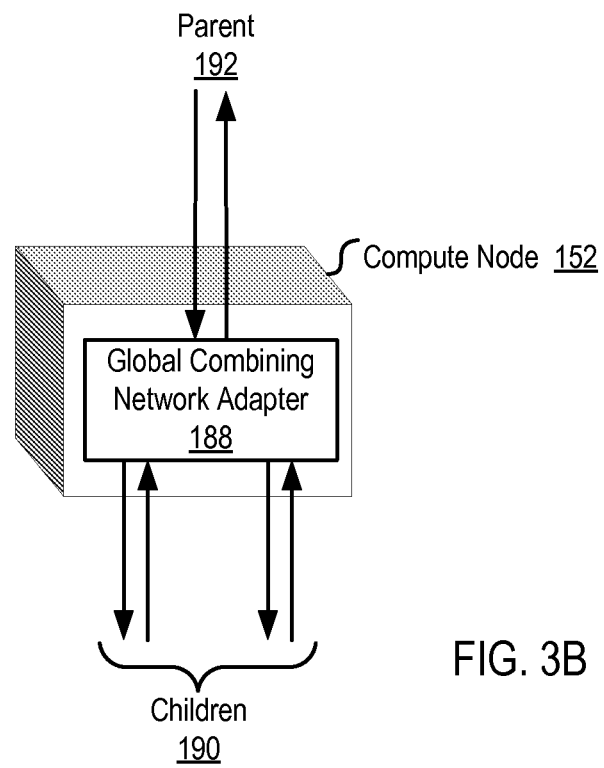
FIG. 3B illustrates an exemplary Global Combining Network Adapter useful in systems capable of reducing power consumption during execution of an application on a plurality of compute nodes according to embodiments of the present invention.

For further explanation, FIG. 3B illustrates an exemplary Global Combining Network Adapter (188) useful in systems capable of reducing power consumption during execution of an application on a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
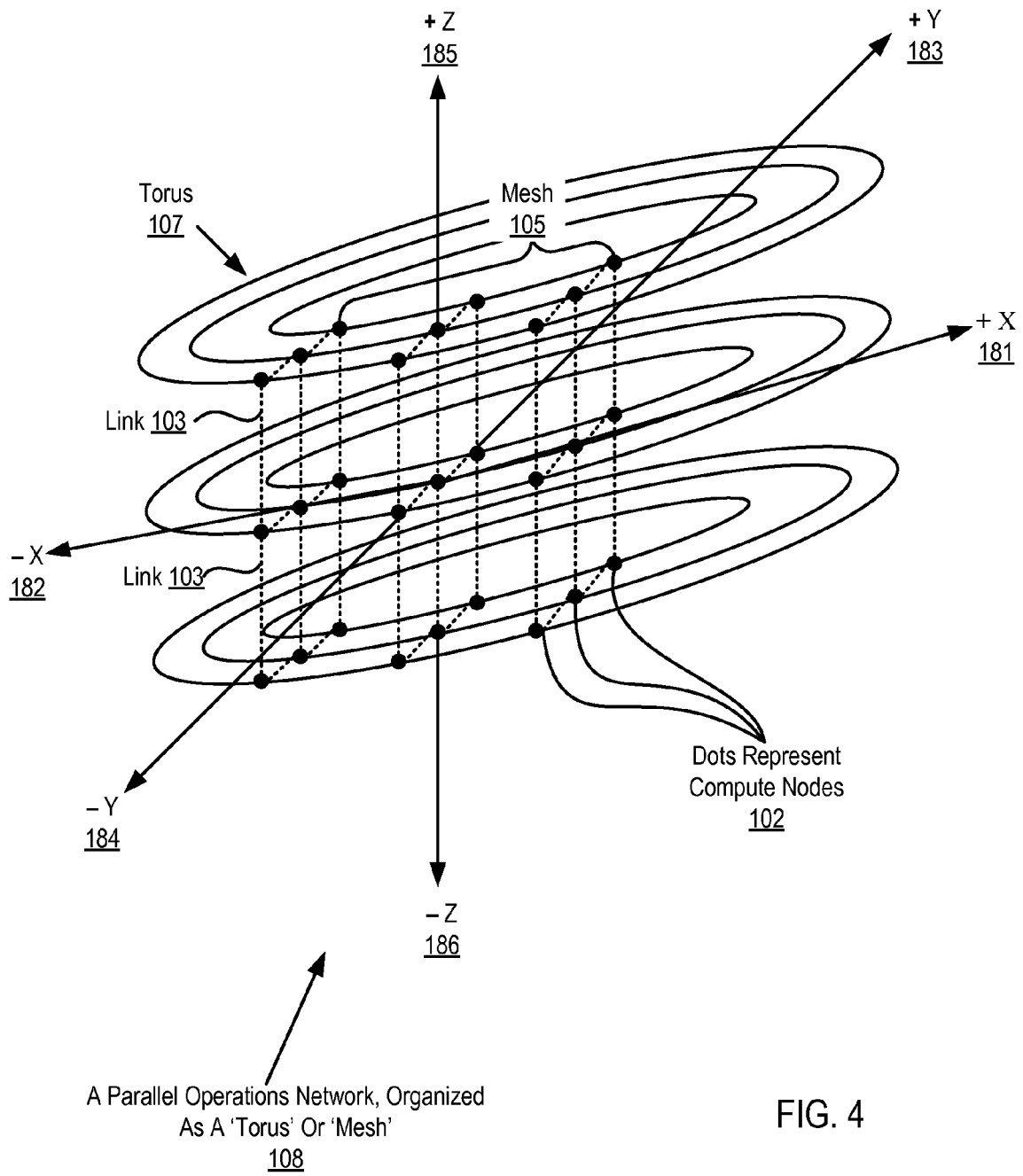
FIG. 4 sets forth a line drawing illustrating an exemplary data communications network optimized for point to point operations useful in systems capable of reducing power consumption during execution of an application on a plurality of compute nodes in accordance with embodiments of the present invention.

For further explanation, FIG. 4 sets forth a line drawing illustrating an exemplary data communications network (108) optimized for point to point operations useful in systems capable of reducing power consumption during execution of an application on a plurality of compute nodes in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in reducing power consumption during execution of an application on a plurality of compute nodes in accordance with embodiments of the present invention may contain only a few compute nodes or may contain thousands of compute nodes.

Figure 5:
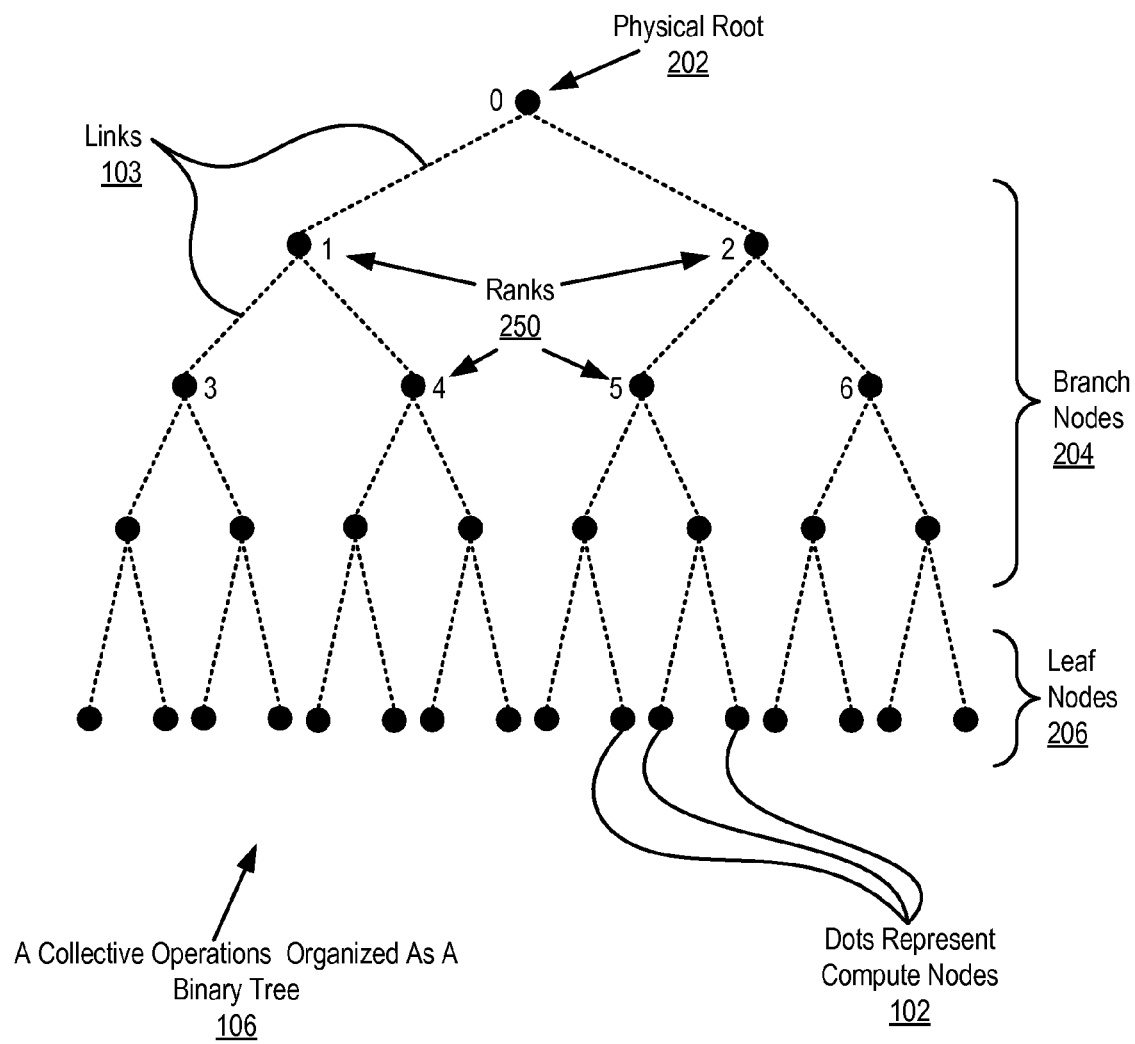
FIG. 5 sets forth a line drawing illustrating an exemplary data communications network optimized for collective operations useful in systems capable of reducing power consumption during execution of an application on a plurality of compute nodes in accordance with embodiments of the present invention.

For further explanation, FIG. 5 sets forth a line drawing illustrating an exemplary data communications network (106) optimized for collective operations useful in systems capable of reducing power consumption during execution of an application on a plurality of compute nodes in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for reducing power consumption during execution of an application on a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
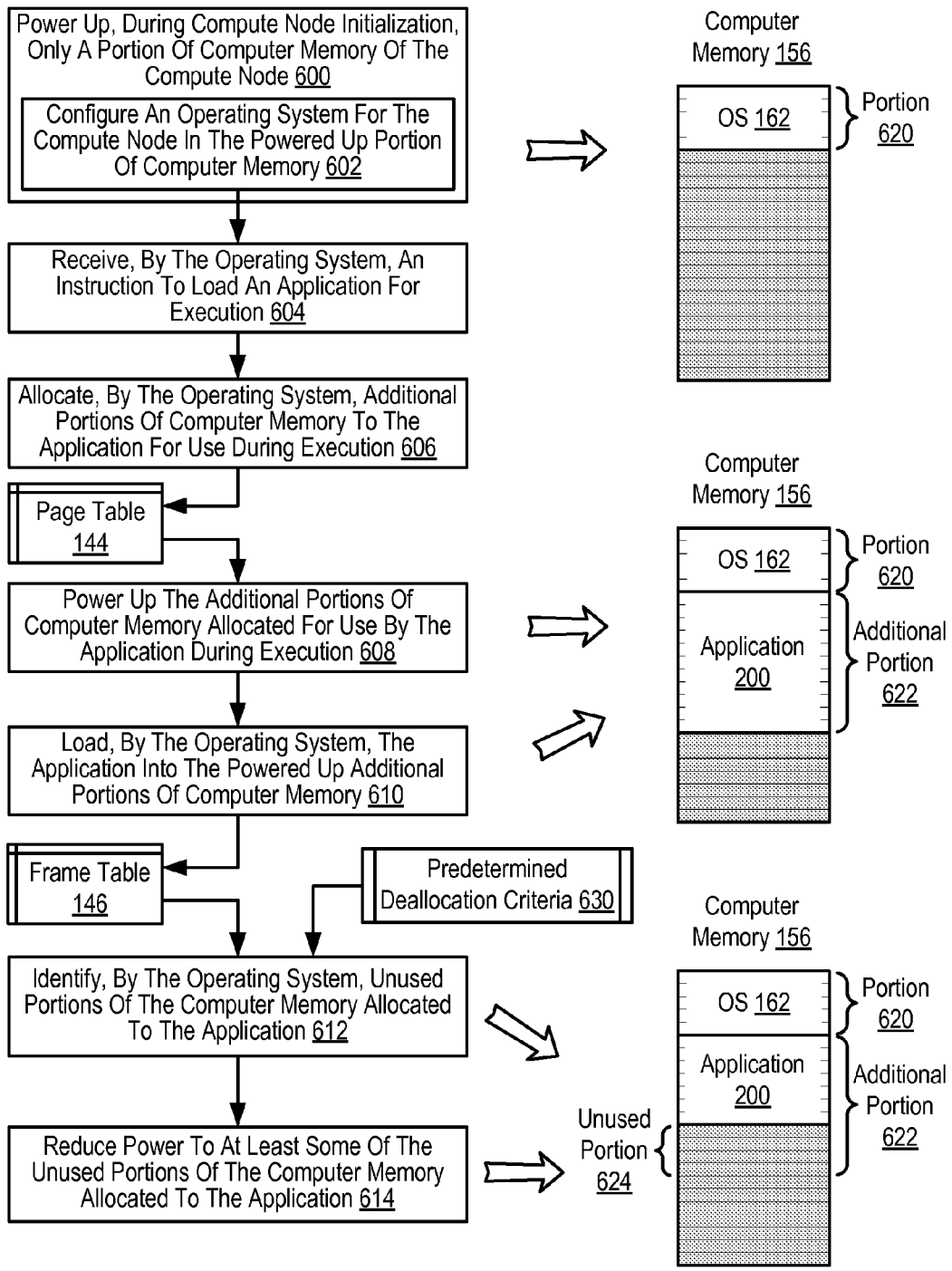
FIG. 6 sets forth a flow chart illustrating an exemplary method for reducing power consumption during execution of an application on a plurality of compute nodes according to embodiments of the present invention.

For further explanation, FIG. 6 sets forth a flow chart illustrating an exemplary method for reducing power consumption during execution of an application on a plurality of compute nodes according to embodiments of the present invention. The compute nodes described with reference to FIG. 6 are connected together for data communications using a plurality of data communications networks. At least one of the data communications networks is optimized for point to point operations, and at least one of the data communications is optimized for collective operations.

The method of FIG. 6 includes powering up (600), during compute node initialization, only a portion (620) of computer memory (156) of the compute node. Powering up (600) only a portion (620) of computer memory (156) of the compute node according to the method of FIG. 6 may be carried out by the compute node's memory controller when the compute node is powered on or cycled. The memory controller may power up (600) only a portion (620) of computer memory (156) of the compute node by providing power to only a select number of memory modules or a select number of RAM integrated circuits on a memory module. In the example of FIG. 6, the portions of the computer memory (156) that are powered up have a white background, while the portions of the computer memory (156) that are powered down have a grey background.

Powering up (600), during compute node initialization, only a portion (620) of computer memory (156) of the compute node according to the method of FIG. 6 includes configuring (602) an operating system (162) for the compute node in the powered up portion (620) of computer memory (156). The memory controller may configure (602) an operating system (162) in the powered up portion (620) of computer memory (156) according to the method of FIG. 6 by allowing the node's processor to copy an image of the operating system (162) to the powered up portion (620) of computer memory (156). The processor may copy an image of the operating system (162) to the powered up portion (620) of computer memory (156) as part of a BIOS initialization sequence. The processor may access an image of the operating system (162) through the network, from the node's non-volatile memory, or in any other manner as will occur to those of skill in the art.

The method of FIG. 6 includes receiving (604), by the operating system, an instruction to load an application (200) for execution. The operating system may receive (604) an instruction to load an application (200) for execution according to the method of FIG. 6 from a user through a user interface provided by the operating system. Examples may include a user double-clicking an icon on a graphical user interface or typing the name of an application in a command line user interface. In other embodiments, the operating system may receive (604) an instruction to load an application (200) for execution according to the method of FIG. 6 from a service node, which operates to configure and manage the compute nodes in a parallel computer.

The method of FIG. 6 also includes allocating (606), by the operating system, additional portions (622) of computer memory (156) to the application (200) for use during execution. The additional memory portions (622) of FIG. 6 represent frames of the computer memory (156). The operating system may allocate (606) additional portions (622) of computer memory (156) to the application (200) according to the method of FIG. 6 by assigning frames of the additional memory portions (622) to virtual memory pages in a page table (144) and assigning those pages of virtual memory to the application (200).

In some embodiments, the operating system may allocate (606) the additional portions (622) of computer memory (156) to the application (200) in dependence upon computer memory allocation instructions included in the application (200). The computer memory allocation instructions are instructions of a computer programming language that allow an application developer to specify that certain variables are statically allocated to portions of computer memory (156) such that the allocations do not dynamically change during execution of the program. An example of a computer programming language that allows such static memory allocations for variables may include FORTRAN.

The method of FIG. 6 includes powering up (608) the additional portions (622) of computer memory (156) allocated for use by the application (200) during execution. Powering up (608) the additional portions (622) of computer memory (156) allocated for use by the application (200) during execution according to the method of FIG. 6 may be carried out by a memory controller upon requests to access those additional portions (622) of computer memory (156) by the node's operating system. The memory controller may power up (608) the additional portions (622) of computer memory (156) according to the method of FIG. 6 by connecting the circuits that implement those additional portions (622) to a power rail.

The method of FIG. 6 also includes loading (610), by the operating system, the application (200) into the powered up additional portions (622) of computer memory (156). The operating system may load (610) the application (200) into the powered up additional portions (622) of computer memory (156) according to the method of FIG. 6 by receiving the application (200) through the network or from data storage and writing the application (200) into the frames of the additional portion (622) of computer memory (156).

Readers will note that the application (200) may not utilize all of the computer memory (156) allocated to the application (200) before the operating system loaded the application (200) into computer memory (156). Often the operating system allocates more computer memory (156) to the application (200) than the application needs during execution, or the application (200) only needs the entire allocated amount during initialization of the application (200) or for processing certain portions of the application (200). Accordingly, the method of FIG. 6 includes identifying (612), by the operating system, unused portions (624) of the computer memory (156) allocated to the application (200) and not utilized by the application (200) during execution and reducing (614) power to at least some of the unused portions (624) of the computer memory (156) allocated to the application (200).

The operating system may identify (612) unused portions (624) of the computer memory (156) allocated to the application (200) according to the method of FIG. 6 by determining which frames of the additional portion (622) are not being utilized by the application (200). The operating system may determining which frames of the additional portion (622) are not being utilized by the application (200) by comparing the access statistics for those frames in the frame table (146) to predetermined deallocation criteria (630) that specifies when those frames may be deallocated from the application (200). The predetermined deallocation criteria (630) may specify when frames may be deallocated from the application (200) based on the time that has transpired since the last time the frame was accessed, whether the frame is currently mapped to a page in virtual memory, and so on. The operating system may then reduce (614) power to at least some of the unused portions (624) of the computer memory (156) allocated to the application (200) by disconnecting the circuitry implementing the unused portion (624) from a power rail.

In some embodiments of the present invention, the computer memory of each compute node may be characterized by varying levels of power consumption and varying levels of performance. That is, different portions of the computer memory may consume energy at different rates and may have different operating characteristics. Varying levels of power consumption and performance often result when two different types of memory are utilized in the same system. These power consumption levels and performance levels may be used to determine which portions of computer memory to allocate to a specific application. For further explanation, FIG. 7 sets forth a flow chart illustrating a further exemplary method for reducing power consumption during execution of an application on a plurality of compute nodes according to embodiments of the present invention.

Figure 7:
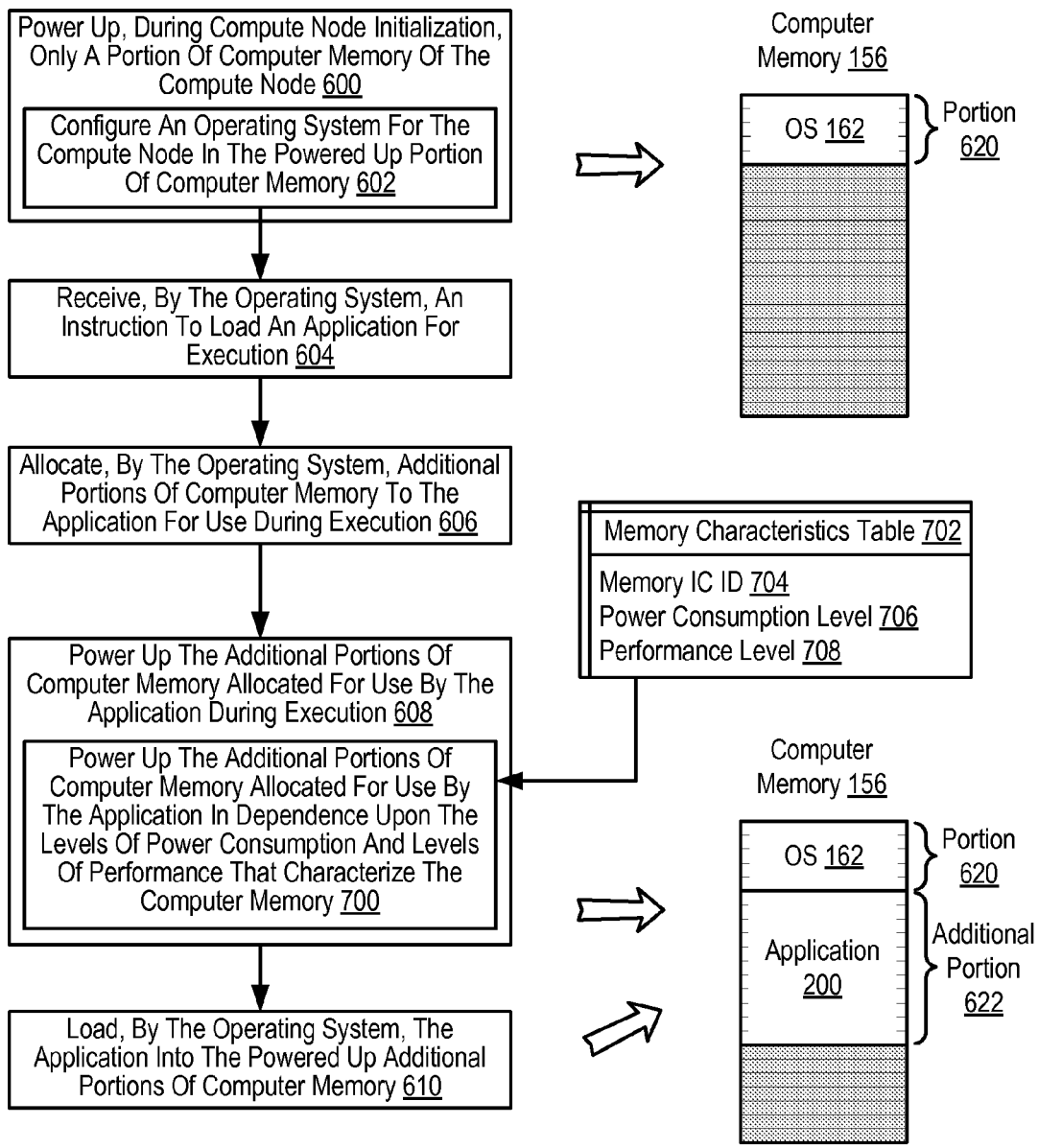
FIG. 7 sets forth a flow chart illustrating a further exemplary method for reducing power consumption during execution of an application on a plurality of compute nodes according to embodiments of the present invention.

The method of FIG. 7 is similar to the method of FIG. 6. That is, the method of FIG. 7 includes: powering up (600), during compute node initialization, only a portion (620) of computer memory (156) of the compute node, including configuring (602) an operating system (162) for the compute node in the powered up portion (620) of computer memory (156); receiving (604), by the operating system (162), an instruction to load an application (200) for execution; allocating (606), by the operating system, additional portions (622) of computer memory (156) to the application (200) for use during execution; powering up (608) the additional portions (622) of computer memory (156) allocated for use by the application (200) during execution; and loading (610), by the operating system (162), the application (200) into the powered up additional portions (622) of computer memory (156). In the example of FIG. 7, the portions of the computer memory (156) that are powered up have a white background, while the portions of the computer memory (156) that are powered down have a grey background.

In the method of FIG. 7, however, allocating (606), by the operating system (162), additional portions (622) of computer memory (156) to the application (200) for use during execution includes allocating (700) the additional portions (622) of computer memory (156) to the application (200) in dependence upon the levels (706) of power consumption and levels (708) of performance that characterize the computer memory (156). The operating system (162) may allocate (700) the additional portions (622) of computer memory (156) to the application (200) according to the method of FIG. 7 by selecting computer memory portions to allocate to the application with the lowest power consumption levels (706) that satisfy minimum performance levels for the application (200). The minimum performance levels for the application (200) of FIG. 7 may be specified in a configuration for the application (200) by the application developer.

The example of FIG. 7 includes a memory characteristics table (702) that associates certain levels (706) of power consumption and levels (708) of performance with identifiers (704) for different RAM integrated circuits implementing the computer memory (156). The power consumption level (706) of FIG. 7 may express the power consumed by the associated portion of computer memory (156) in units of Watts. The performance levels (708) of FIG. 7 may express the performance of the associated portion of computer memory (156) as a maximum operating frequency, maximum device cycle time, error checking capabilities, or some other performance metric as will occur to those of skill in the art. The operating system (162) may derive the information for the memory characteristics table (702) from Serial Presence Detect ('SPD') content, which is stored in non-volatile memory of the memory modules implementing the computer memory (156). The SPD content is information about the memory module that is stored in 256 byes of the module's non-volatile memory according to the Joint Electron Device Engineering Council ('JEDEC') Standard No. 21-C. According to JEDEC Standard No. 21-C, the first 128 bytes of the SPD content includes information such as, for example, memory type, memory size, operating frequencies, manufacturing information, and so on. The last 128 bytes of the SPD content area is available for custom uses such as storing power consumption levels (706) and performance levels (708) useful according to embodiments of the present invention.

Exemplary embodiments of the present invention are described largely in the context of a fully functional computer system for reducing power consumption during execution of an application on a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing power consumption during execution of an application on a plurality of compute nodes, the method comprising:
    powering up, during compute node initialization, only a portion of computer memory of a compute node;
    configuring an operating system for the compute node in the powered up portion of computer memory, including copying an image of the operating system to the powered up portion of computer memory;
    receiving, by the operating system, an instruction to load an application for execution;
    allocating, by the operating system, additional portions of computer memory to the application for use during execution;
    powering up the additional portions of computer memory allocated for use by the application during execution, wherein powering up the additional portions of computer memory allocated for use by the application during execution further comprises powering up the additional portions of computer memory upon requests to access those additional portions of computer memory; and
    loading, by the operating system, the application into the powered up additional portions of computer memory.

2. The method of claim 1 further comprising:
    identifying, by the operating system, unused portions of the computer memory allocated to the application, the unused portions not utilized by the application during execution; and
    reducing power to at least some of the unused portions of the computer memory allocated to the application.

3. The method of claim 1 wherein:
    the computer memory of each compute node is characterized by varying levels of power consumption and varying levels of performance; and
    allocating, by the operating system, additional portions of computer memory to the application for use during execution further comprises allocating the additional portions of computer memory to the application in dependence upon the levels of power consumption and levels of performance that characterize the computer memory.

4. The method of claim 1 wherein allocating, by the operating system, additional portions of computer memory to the application for use during execution further comprises allocating the additional portions of computer memory to the application in dependence upon computer memory allocation instructions included in the application.

5. The method of claim 1 wherein the plurality of compute nodes are connected together for data communications using a plurality of data communications networks, at least one of the data communications networks optimized for collective operations, and at least one of the data communications networks optimized for point to point operations.

6. A parallel computer capable of reducing power consumption during execution of an application on a plurality of compute nodes, the parallel computer comprising the plurality of compute nodes, each compute node comprising one or more computer processors and computer memory operatively coupled to the computer processors, the computer memory having disposed within it computer program instructions capable of:
    powering up, during compute node initialization, only a portion of computer memory of a compute node;
    configuring an operating system for the compute node in the powered up portion of computer memory, including copying an image of the operating system to the powered up portion of computer memory;
    receiving, by the operating system, an instruction to load an application for execution;
    allocating, by the operating system, additional portions of computer memory to the application for use during execution;
    powering up the additional portions of computer memory allocated for use by the application during execution, wherein powering up the additional portions of computer memory allocated for use by the application during execution further comprises powering up the additional portions of computer memory upon requests to access those additional portions of computer memory; and
    loading, by the operating system, the application into the powered up additional portions of computer memory.

7. The parallel computer of claim 6 wherein the computer memory has disposed within it computer program instructions capable of:
    identifying, by the operating system, unused portions of the computer memory allocated to the application, the unused portions not utilized by the application during execution; and
    reducing power to at least some of the unused portions of the computer memory allocated to the application.

8. The parallel computer of claim 6 wherein:
    the computer memory of each compute node is characterized by varying levels of power consumption and varying levels of performance; and
    allocating, by the operating system, additional portions of computer memory to the application for use during execution further comprises allocating the additional portions of computer memory to the application in dependence upon the levels of power consumption and levels of performance that characterize the computer memory.

9. The parallel computer of claim 6 wherein allocating, by the operating system, additional portions of computer memory to the application for use during execution further comprises allocating the additional portions of computer memory to the application in dependence upon computer memory allocation instructions included in the application.

10. The parallel computer of claim 6 wherein the plurality of compute nodes are connected together for data communications using a plurality of data communications networks, at least one of the data communications networks optimized for collective operations, and at least one of the data communications networks optimized for point to point operations.

11. A computer program product for reducing power consumption during execution of an application on a plurality of compute nodes, the computer program product disposed upon a computer readable recordable medium, the computer program product comprising computer program instructions capable of:
    powering up, during compute node initialization, only a portion of computer memory of a compute node;
    configuring an operating system for the compute node in the powered up portion of computer memory, including copying an image of the operating system to the powered up portion of computer memory;

receiving, by the operating system, an instruction to load an application for execution;

allocating, by the operating system, additional portions of computer memory to the application for use during execution;

powering up the additional portions of computer memory allocated for use by the application during execution, wherein powering up the additional portions of computer memory allocated for use by the application during execution further comprises powering up the additional portions of computer memory upon requests to access those additional portions of computer memory; and loading, by the operating system, the application into the powered up additional portions of computer memory.

12. The computer program product of claim 11 further comprising computer program instructions capable of:

identifying, by the operating system, unused portions of the computer memory allocated to the application, the unused portions not utilized by the application during execution; and reducing power to at least some of the unused portions of the computer memory allocated to the application.

13. The computer program product of claim 11 wherein:

the computer memory of each compute node is characterized by varying levels of power consumption and varying levels of performance; and allocating, by the operating system, additional portions of computer memory to the application for use during execution further comprises allocating the additional portions of computer memory to the application in dependence upon the levels of power consumption and levels of performance that characterize the computer memory.

14. The computer program product of claim 11 wherein allocating, by the operating system, additional portions of computer memory to the application for use during execution further comprises allocating the additional portions of computer memory to the application in dependence upon computer memory allocation instructions included in the application.

15. The computer program product of claim 11 wherein the plurality of compute nodes are connected together for data communications using a plurality of data communications networks, at least one of the data communications networks optimized for collective operations, and at least one of the data communications networks optimized for point to point operations.

* * * * *